United States Patent
Manabe et al.

(10) Patent No.: US 6,661,971 B2
(45) Date of Patent: Dec. 9, 2003

(54) CAMERA HAVING A HOLDING MEMBER FOR HOLDING A DEVICE FOR MEASURING A LENS-TO-SUBJECT DISTANCE

(75) Inventors: Mitsuo Manabe, Saitama (JP); Kenji Yamane, Saitama (JP); Yukihiro Kaneko, Saitama (JP)

(73) Assignee: Fuji Photo Opticsal Cp., Ltd., Omiya (JP)

( * ) Notice: Subject to any disclaimer, the term of this patent is extended or adjusted under 35 U.S.C. 154(b) by 0 days.

(21) Appl. No.: 10/106,987

(22) Filed: Mar. 26, 2002

(65) Prior Publication Data

US 2002/0141746 A1 Oct. 3, 2002

(30) Foreign Application Priority Data

Mar. 29, 2001 (JP) ........................................ 2001-094960

(51) Int. Cl.$^7$ .............................. G03B 3/00; G03B 17/02
(52) U.S. Cl. ......................... 396/89; 396/539; 396/541
(58) Field of Search ........................ 396/89, 535, 538, 396/539, 541

(56) References Cited

U.S. PATENT DOCUMENTS 6,157,788 A * 12/2000 Sugita et al. ................ 396/539
2002/0048461 A1 * 4/2002 Tanaka ........................ 396/539

FOREIGN PATENT DOCUMENTS

| JP | 10-312014 | 11/1998 |
|----|-----------|---------|
| JP | 2000-111986 | 4/2000 |

* cited by examiner

*Primary Examiner*—Russell Adams
*Assistant Examiner*—Arthur A Smith
(74) *Attorney, Agent, or Firm*—Frommer Lawrence & Haug LLP; Matthew K. Ryan

(57) ABSTRACT

Provided is a camera capable of contributing reductions in the number of components and manufacturing costs. A holding member is mounted on a top portion of a camera body. A block portion for holding a device for range-finding, a finder and so on, a semicylindrical portion for holding a battery, and a plate portion for holding a gear train of the camera body are integrally combined to form the holding member. Therefore, the number of components of the camera can be reduced, thereby resulting in a reduction in the manufacturing costs.

14 Claims, 5 Drawing Sheets

CAMERA HAVING A HOLDING MEMBER FOR HOLDING A DEVICE FOR MEASURING A LENS-TO-SUBJECT DISTANCE

BACKGROUND OF THE INVENTION

1. Field of the Invention

The present invention relates to a camera, and more specifically, the invention relates to a camera having a holding member for holding a device for measuring a lens-to-subject distance (i.e. range-finding) and so on.

2. Description of the Related Art

Generally, in a camera, components, which are required to be mounted with a high degree of accuracy, such as a device for range-finding (light-emitting device and photo-sensing device), and optical parts constituting a finder, are mounted in a block-shaped holding member. The holding member is secured to the upper side of a camera body by, for example, screws. An example of such a holding member is disclosed in Japanese Unexamined Patent Publication No. 10-312014. The holding member disclosed in the publication holds not only a device for range-finding and finder optical parts but also a gear train disposed on the upper side of a camera body.

Incidentally, in the camera, a battery chamber for accommodating a battery is provided. The battery chamber, as disclosed in Japanese Unexamined Patent Publication No. 2000-111986, is often mounted on the upper side of the camera body adjacent to the finder or the like.

In recent years, in order to reduce the cost of manufacturing a camera, a reduction in the number of components is strongly desired. However, as described above, when the holding member for holding the device for range-finding, the finder optical parts and so on, and the battery chamber are separately constructed, it is difficult to reduce the number of components.

SUMMARY OF THE INVENTION

In light of the foregoing, it is an object of the present invention to provide a camera capable of contributing to reductions in the number of components and manufacturing costs.

A camera according to the invention having a range-finding system for measuring a lens-to-subject distance and using a battery, the camera comprises a camera body, and a holding member mounted on the camera body, and integrally including a first holding portion for holding at least the range-finding system and a second holding portion for holding the battery.

In the camera according to the invention, the first holding portion for holding at least the range-finding system and the second holding portion for holding a battery are integrated, and constitute the holding member, which is mounted on the camera body.

In the camera according to the invention, it is preferable that the holding member further integrally includes an elastic deformable buffer portion disposed between the first holding portion and the second holding portion. Further, it is preferable that the camera body includes a rotatable take-up spool for taking up a film, and the holding member holds the take-up spool to be rotatable. In addition, it is preferable that the holding member has a shape extending in a longitudinal direction with a width in a direction orthogonal to the longitudinal direction, and the holding member is secured to the camera body at a plurality of points determined in a staggered arrangement both sides of a central axis, the central axis passing through a center of the width and extending in the longitudinal direction.

Other and further objects, features and advantages of the invention will appear more fully from the following description.

DETAILED DESCRIPTION OF THE PREFERRED EMBODIMENTS

A preferred embodiment of the invention will be described in detail below referring to the accompanying drawings.

Figure 1:
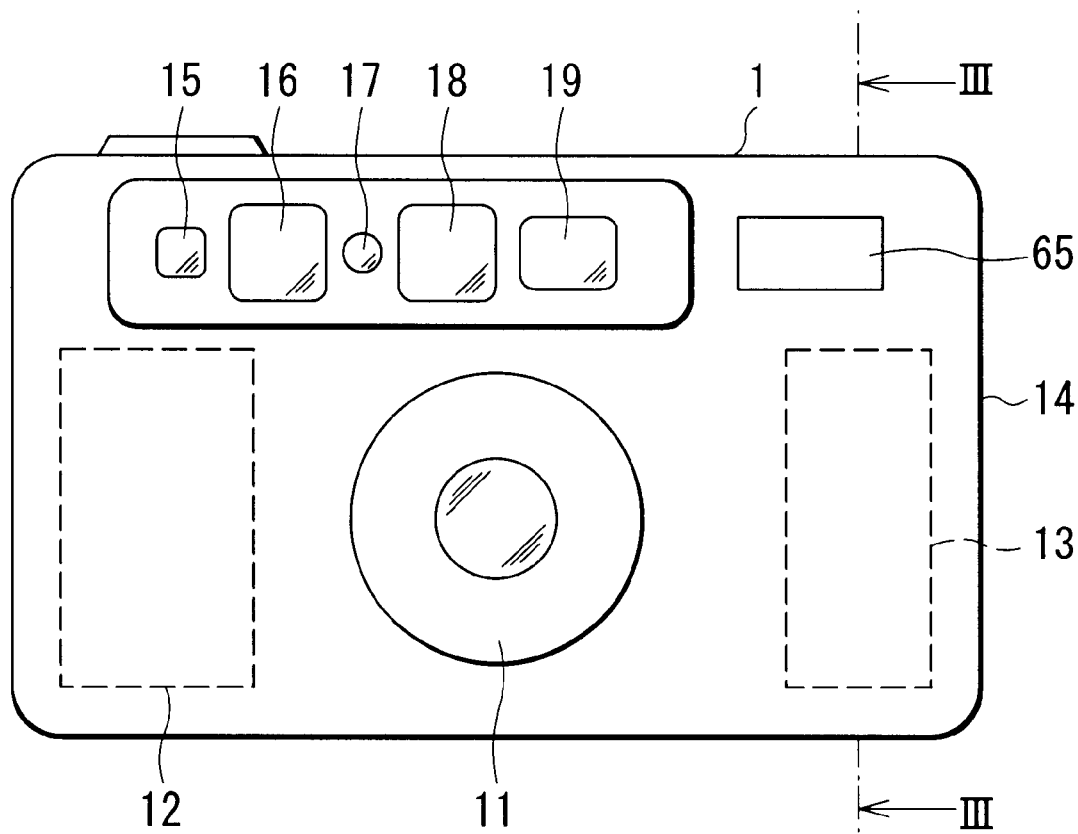
FIG. 1 is a front view showing an appearance of a camera according to an embodiment of the invention.

FIG. 1 shows a front view (that is, a view from the side of a subject) of a camera 1 according to the embodiment of the invention. In the following description, the side of the subject is considered as "front", and the side of a photographer is considered as "rear". The camera 1 is a so-called compact camera, and comprises a casing 14 of a rectangular shape. A zoom lens barrel 11 having a picture-taking lens is disposed in a substantially central portion of the camera 1 when viewed from the front. In the camera 1, a film chamber 12, where a film cartridge (not shown) is loaded, and a take-up chamber 13, where a film transported from the film cartridge is taken up, are disposed on the both sides of the zoom lens barrel 11. Further, the camera 1 has a shape extending in a film-transporting direction (that is, in a lateral direction in FIG. 1).

In the camera 1, on the upper side of the zoom lens barrel 11, a photo-sensing portion for photometry 15, a light-emitting portion for range-finding 16, a red-eye minimizing lamp 17, a finder portion 18 and a photo-sensing portion for range-finding 19 are provided. The light-emitting portion for range-finding 16 and the photo-sensing portion for range-finding 19 are provided for measuring a lens-to-subject distance. Also, a window portion for flash light 65 is disposed adjacent to the photo-sensing portion for range-finding 19.

Figure 2:
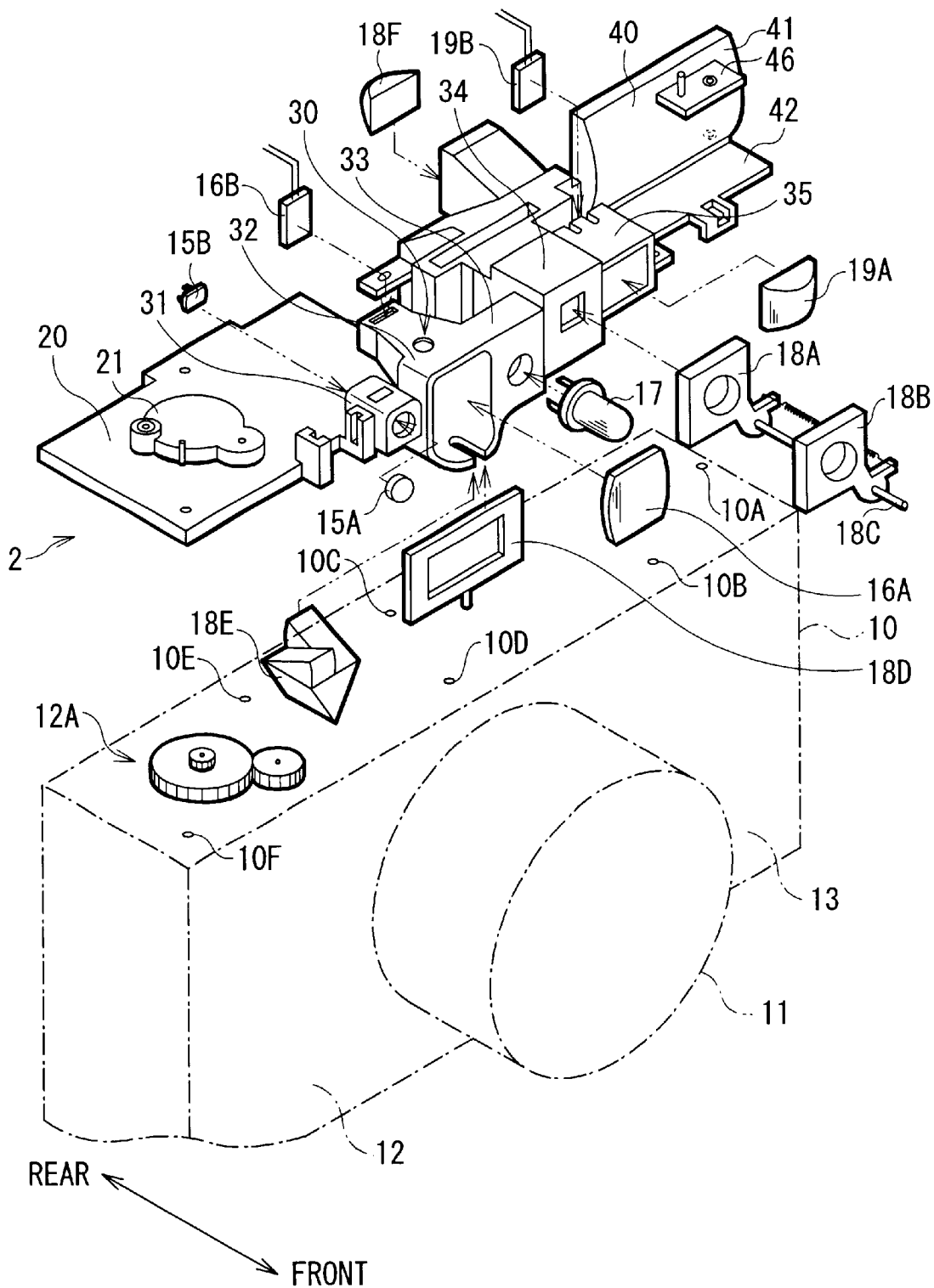
FIG. 2 is an exploded perspective view showing a configuration of the camera shown in FIG. 1.

FIG. 2 shows an exploded perspective view of an internal configuration of the camera 1 shown in FIG. 1. The camera 1 comprises a camera body 10 covered with the casing 14 (refer to FIG. 1). The camera body 10 includes the lens barrel 11, the film chamber 12 and the take-up chamber 13 described above. On the upper side of the camera body 10, a holding member 2 is mounted. The holding member 2 is integrally molded of plastic, and has a shape extending in a direction along a longitudinal direction of the camera 1. The holding member 2 corresponds to a specific example of "holding member" in the invention.

The holding member 2 includes a plate portion 20, a block portion 30 and a semicylindrical portion 40 aligned along a longitudinal direction thereof. The plate portion 20, the block portion 30 and the semicylindrical portion 40 are disposed on the upper sides of the film chamber 12, the zoom lens barrel 11 and the take-up chamber 13, respectively, in a state that the holding member 2 is mounted on the camera body 10. The plate portion 20 is provided for holding a gear train 12A disposed on the upper side of the film chamber 12 of the camera body 10. The block portion 30 is provided for holding the respective components of the photo-sensing portion for photometry 15, the light-emitting portion for range-finding 16, the red-eye minimizing lamp 17, the finder portion 18 and the photo-sensing portion for range-finding 19 shown in FIG. 1. The semicylindrical portion 40 is provided for holding a battery. The block portion 30 corresponds to a specific example of "first holding portion" in the invention, and the semicylindrical portion 40 corresponds to a specific example of "second holding portion" in the invention.

The plate portion 20 has a projected portion 21 which is projected upward to a predetermined degree. A recessed portion is formed on the bottom side of the projected portion 21 (that is, on the side of the camera body 10), and the gear train 12A is accommodated in the recessed portion. The gear train 12A is provided for turning a spool of the film cartridge (not shown) accommodated in the film chamber 12 of the camera body 10.

The block portion 30 has a first mounted part 31, a second mounted part 32, a third mounted part 33, a fourth mounted part 34 and a fifth mounted part 35 in order from the side of the plate portion 20.

The first mounted part 31 is a substantially-prismatic-shaped part having an opening in the front thereof. A lens for photometry 15A is mounted in the opening of the first mounted portion 31, and a photo-sensing device for photometry 15B is mounted in the interior of the first mounted portion 31. The lens for photometry 15A and the photo-sensing device for photometry 15B constitute the photo-sensing portion for photometry 15 (refer to FIG. 1).

The second mounted portion 32 is a substantially-tubular-shaped part having an opening in the front thereof. A projection lens 16A is mounted in the opening of the second mounted part 32, and a light-emitting device 16B which emits infrared radiations is mounted in the interior of the second mounted part 32. The projection lens 16A and the light-emitting device 16B constitute the above-mentioned light-emitting portion for range-finding 16 (refer to FIG. 1).

The third mounted part 33 has an opening in the front thereof. The red-eye minimizing lamp 17 made of a light-emitting diode (LED) is mounted in the opening of the third mounted part 33.

The fourth mounted part 34 is a substantially-prismatic-shaped hollow container having a window portion in the front thereof. A pair of movable lenses 18A and 18B, and a guide bar 18C for guiding fore-and-aft motions of the movable lenses 18A and 18B are accommodated in the fourth mounted part 34. On the rear side of the fourth mounted part 34, a frame 18D, a prism 18E and an eyepiece lens 18F are mounted. The movable lenses 18A and 18B, the frame 18D, the prism 18E and the eyepiece lens 18F constitute the finder portion 18 (refer to FIG. 1). The movable lenses 18A and 18B move in synchronization with a zoom lens (not shown) in the zoom lens barrel 11, so an image of the subject scaled corresponding to a shooting magnification specified by a position where the zoom lens is moved can be viewed through the eyepiece lens 18F.

The fifth mounted part 35 is a substantially-prismatic-shaped part having an opening in the front thereof. A lens for photo-sensing 19A is mounted in the opening of the fifth mounted part 35, and a photo-sensing device 19B made of a photo diode is mounted in the interior of the fifth mounted part 35. The lens for photo-sensing 19A and the photo-sensing device 19B constitute the photo-sensing portion for range-finding 19 (refer to FIG. 1) to sense the reflection of light emitted from the above-mentioned light-emitting portion for range-finding 16.

Figure 3:
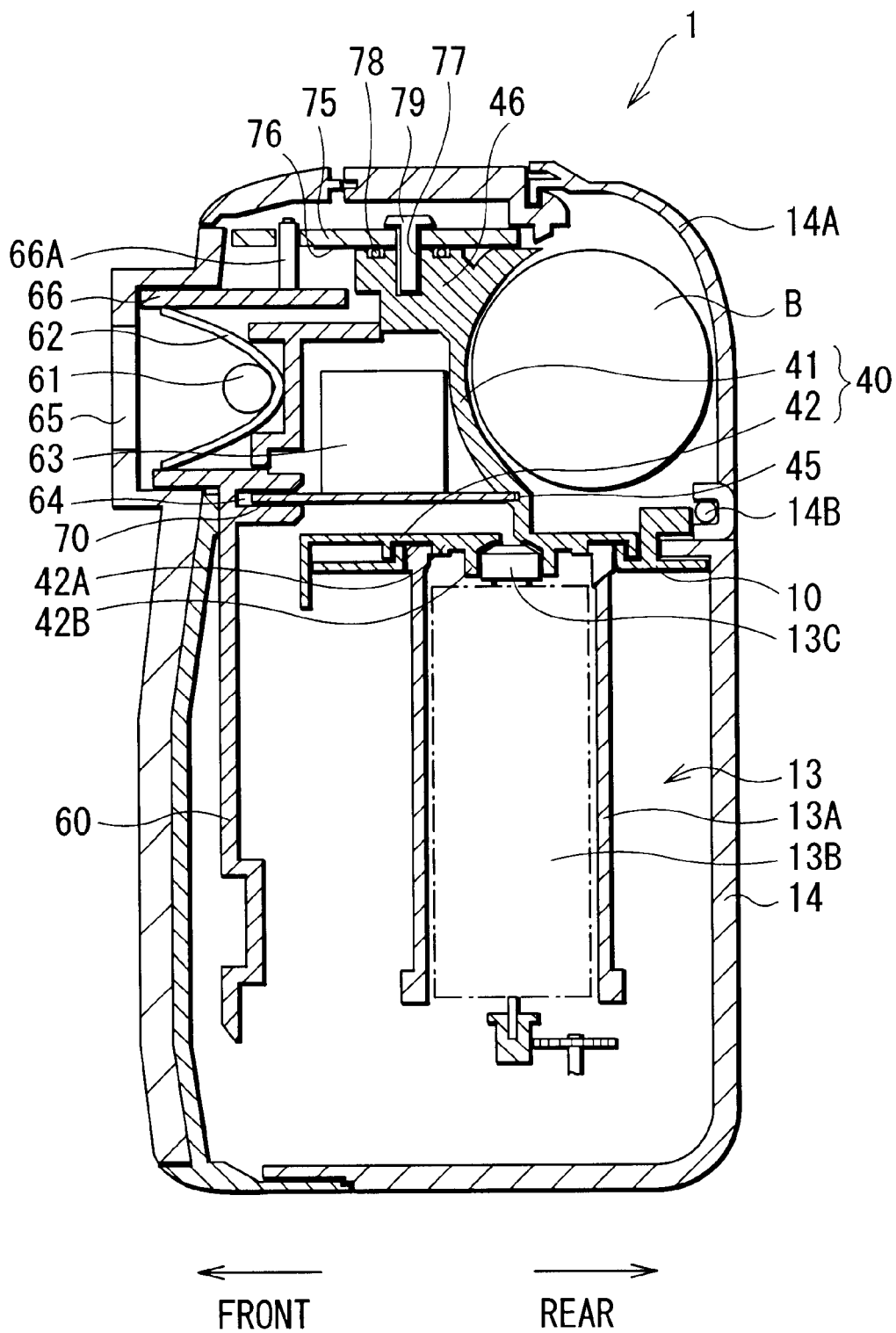
FIG. 3 is a sectional side view of the camera shown in FIG. 1.

FIG. 3 shows a cross-sectional view of the camera 1 shown in FIG. 1 taken along the line III—III. The semicylindrical portion 40 has an arc-shaped wall 41 having a substantially-semi-arc-shaped section projecting toward the front. The arc-shaped wall 41 is disposed in a substantially central portion in the direction of the width of the camera 1, and holds a battery B on the rear side thereof. In the casing 14, a battery lid 14A is formed on a region corresponding to the rear side of the semicylindrical portion 40. The battery lid 14A can pivot about a spindle 14B disposed in the bottom end portion thereof. The battery lid 14A pivots so as to be capable of replacing the battery B held in the semicylindrical portion 40.

A pressure plate 42 of a plate-shaped part extends from the bottom end of the arc-shaped wall 41 of the semicylindrical portion 40 toward the front. The take-up spool 13A of a rotatable cylindrical shape is disposed in the take-up chamber 13 of the camera body 10, and in the take-up spool 13A, a motor 13B is disposed. On the pressure plate 42 of the semicylindrical portion 40, an engagement part 42A slidably engaged with the top end edge of the take-up spool 13A and an engagement part 42B engaged with a spindle of the motor 13B are formed. The semicylindrical portion 40 holds the take-up spool 13A of the camera body 10 to be rotatable by the pressure plate 42.

In the front of the semicylindrical portion 40, a predetermined space is formed. A flash light-emitting tube 61, a reflector 62 for reflecting light emitted from the flash light-emitting tube 61 toward the front, a flash drive portion (trigger coil) 63 for making the flash light-emitting tube 61 emit light, and a flash control board 70 for controlling a drive of the flash drive portion 63 are disposed in the space. The flash light-emitting tube 61 and the reflector 62 are supported by a flash holding plate 60 mounted on the front side of the take-up chamber 13. The flash control board 70 is held in a horizontal position (that is, in parallel with the pressure plate 42) by a slit 45 formed in an outer face (the front side) of the arc-shaped wall 41 of the semicylindrical portion 40, and a slit 64 formed in the flash holding plate 60 in a state that the both ends of the flash control board 70 are engaged in the slits 45 and 64. Further, a flash window portion 65 is formed in the casing 14 in a position corresponding to the front of the flash light-emitting tube 61. Thereby, when the flash control board 70 makes the flash drive portion 63 drive, the flash light-emitting tube 61 emits light, and the light is emitted from the flash window portion 65 directly or after the light is reflected on the reflector 62.

A supporting plate 46 extending in parallel with the pressure plate 42 is formed on the top end of the arc-shaped wall 41 of the semicylindrical portion 40. A screw hole 77 is formed in the top face of the supporting plate 46, and a ring-shaped part 78 made of an elastic material is mounted in the vicinity of the screw hole 77. A flexible circuit board 76 is disposed on the top face of the supporting plate 46, and a circuit board 75 is stacked on the top face of the flexible circuit board 76. By screwing a screw 79 into the screw hole 77 to be tightened, the flexible circuit board 76 is tightly sandwiched between the circuit board 75 and the supporting plate 46, and thereby the circuit board 75 and the flexible circuit board 76 are pressed against each other. In addition, a front end portion of the circuit board 75 reaches above a flat face 66 formed on a top end portion of the flash holding plate 60, and a dowel pin 66A provided on the flat face 66 in a protruding condition is engaged in a positioning hole formed in the circuit board 75.

Figure 4:
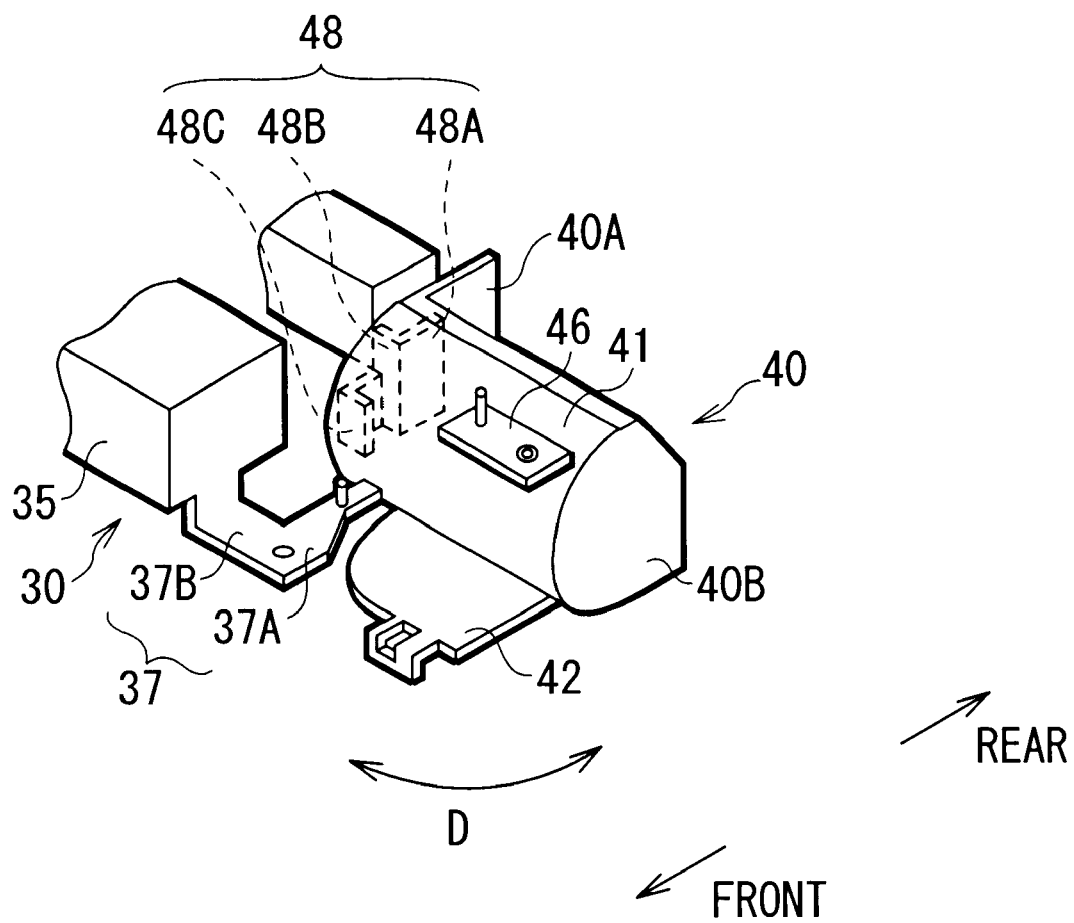
FIG. 4 is a perspective view for explaining a buffer portion disposed between a block portion and a semicylindrical portion of the camera shown in FIG. 1.

FIG. 4 is a perspective view for explaining a joint portion of the semicylindrical portion 40 and the block portion 30. The semicylindrical portion 40 has side plates 40A and 40B, which are a pair of plate-shaped parts disposed in parallel with each other, on both sides of the axial direction of the arc-shaped wall 41. The side plates 40A and 40B are provided for holding the substantially-cylindrical-shaped battery B (refer to FIG. 3) in such a manner that the battery B is sandwiched between the side plates 40A and 40B.

An L-shaped axis 37 is disposed between the semicylindrical portion 40 and the block portion 30. The L-shaped axis 37 has a major axis portion 37A extending from the outer face of the arc-shaped wall 41 toward the front, and a minor axis portion 37B extending from the front end of the major axis portion 37A toward the block portion 30. The minor axis portion 37B is integrally connected to the vicinity of the front end of the block portion 30. The L-shaped axis 37 corresponds to a specific example of "buffer portion" in the invention.

Further, a support piece 48 is formed between the side plate 40A of the semicylindrical portion 40 and an end face of the block portion 30 facing the side plate 40A. The support piece 48 has a flat plate portion 48A integrally formed with the side plate 40A of the semicylindrical portion 40, and a flat plate 48B extending from the front end edge of the flat plate portion 48A toward the block portion 30, and integrally connected with an end face of the block portion 30. Moreover, the support piece 48 has a reinforcing piece 48C extending from the vicinity of an end portion of the flat plate portion 48B in the side of the black portion 30 toward the front, and bending at an angle of 90° to integrally connect with the side plate 40A of the semicylindrical portion 40.

As described above, the semicylindrical portion 40 is supported by the block portion 30 via the L-shaped axis 37 in the front side and the support piece 48 in the rear side. The major axis portion 37A of the L-shaped axis 37 is elastic-deformably formed. Therefore, when an external force which makes the semicylindrical portion 40 move forward is applied, the major axis portion 37A of the L-shaped axis 37 is elastically deformed, and the semicylindrical portion 40 can swing (about the support piece 48 as a pivot) toward a direction indicating an arrow D in the drawing. Thereby, the external force, which is applied when a battery is installed into the semicylindrical portion 40, can be reduced so as not to be transmitted to the block portion 30.

Figure 5:
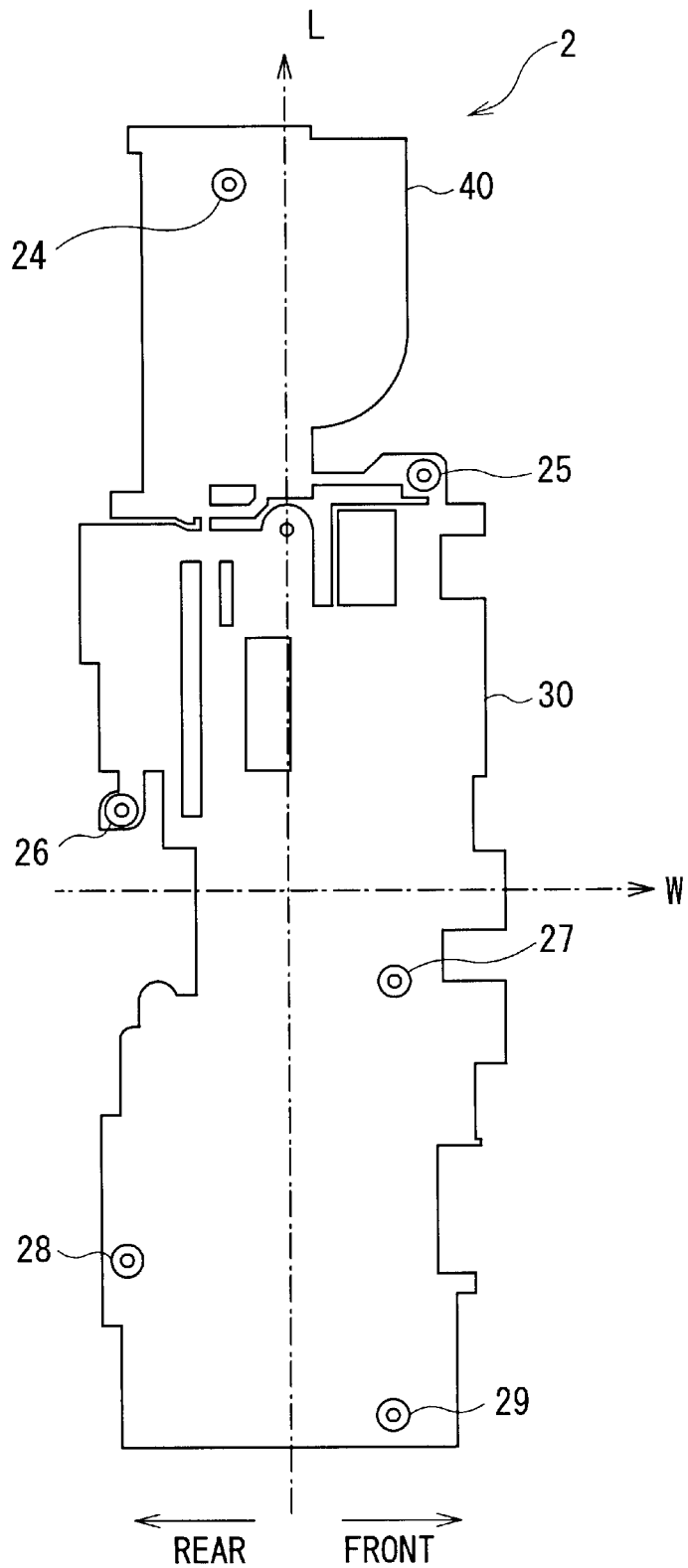
FIG. 5 is a plane view showing a plane shape of a holding member shown in FIG. 2.

FIG. 5 shows a plane outline of the holding member 2 shown in FIG. 2. In the description, an axis extending toward the direction of the length through a substantially central portion in the direction of the width (cross direction) in the holding member 2 is defined as a central axis L. The holding member 2 has six mounting holes 24, 25, 26, 27, 28 and 29 alternately aligned on opposite sides of the central axis L in a direction along the central axis L. In the top face of the camera body 10, screw holes 10A, 10B, 10C, 10D, 10E and 10F (refer to FIG. 2), which correspond to the six mounting holes 24, 25, 26, 27, 28 and 29, respectively, are formed. The six screws (not shown) are put through the mounting holes 24 to 29 of the holding member 2, respectively, and are screwed into the screw holes 10A to 10F of the camera body 10. Thereby, the holding member 2 is secured to the camera body 10.

Next, procedural steps of assembling the camera 1 configured in this manner will be described referring to FIG. 2. When assembling the camera 1, each optical part is mounted in the holding member 2. That is, the lens for photo-sensing 15A and the photo-sensing device 15B are mounted in the first mounted part 31 of the block portion 30, and the projection lens 16A and the light-emitting device 16 are mounted in the second mounted part 32. The red-eye minimizing lamp 17 is mounted in the third mounted part 33. Further, the movable lenses 18A and 18B, the guide bar 18C, the frame 18D, the prism 18E and the eyepiece lens 18F are mounted in the fourth mounted part 34, and the lens for photo-sensing 19A and the photo-sensing device 19B are mounted in the fifth mounted part 35.

The holding member 2 in which the optical parts are mounted in this manner is secured to the camera body 10. That is, six screws (not shown) are put through the mounting holes 24 to 29 (refer to FIG. 5) of the holding member 2, respectively, and are screwed into the screw holes 10A to 10F of the camera body 10. Incidentally, it is assumed that the camera body 10 has already been assembled. At this time, the screws are tightened in order from the screw close to the center of the holding member 2 along the direction of the central axis L shown in FIG. 5. That is, after the mounting holes 26 and 27 are tightened, the mounting holes 25 and 28 are tightened, and then the mounting holes 24 and 29 are tightened. Thereby, when the holding member 2 is mounted on the camera body 10, distortions which may occur in the holding member 2 can be dispersed so as not to be concentrated in one point. In particular, distortions can be prevented from being concentrated in the block portion 30 including components required to be mounted with a high degree of accuracy.

On the other hand, when the holding member 2 is mounted on the camera body 10, the pressure plate 42 of the semicylindrical portion 40 abuts against the top end of the take-up spool 13A of the take-up chamber 13 in the camera body 10 to hold the take-up spool 13A in the axial direction. Moreover, the plate portion 20 holds the gear train 12A, which is disposed on the top portion of the film chamber 12 of the camera body 10, on the bottom side of the projected portion 21. That is, only by mounting the holding member 2 on the camera body 10, the take-up spool 13A and the gear train 12A can be held.

After mounting the holding member 2 on the camera body 10, the flash holding plate 60, where the flash light emitting tube 61, the reflector 62 and the flash control board 70 have already been mounted, is mounted on the front face of the camera body 10. An end of the flash control board 70 is engaged in the slit 45 of the semicylindrical portion 40. It is assumed that the flash drive portion 63 has already been mounted on the flash control board 70.

In addition, as shown in FIG. 3, on the supporting plate 46 of the semicylindrical portion 40, the flexible circuit board 76 and the circuit board 75 are stacked, and secured to the supporting plate 46 with the screw 79. Thereby, the flexible circuit board 76 is tightly sandwiched between the supporting plate 46 and the circuit board 75, and the flexible circuit board 76 and the circuit board 75 are pressed against each other. As the ring-shaped part 78 made of an elastic material is disposed on the supporting plate 46, the flexible circuit board 76 and the circuit board 75 are more securely pressed against each other.

After that, the casing 14 is mounted so as to cover the camera body 10 and the holding member 2, and then the camera 1 is completed.

When the battery B is installed into the camera 1, the battery lid 14A in the rear side of the casing 14 is opened, and the battery B is installed into the semicylindrical portion 40. The semicylindrical portion 40 receive an external force toward the front when the battery B is installed, although the external force is absorbed by an elastic deformation of the major axis portion 37A of the L-shaped axis 37, so that the external force to be transmitted to the block portion 30 is significantly reduced. Therefore, the block portion 30 including components required to be mounted with a high degree of accuracy can be prevented from being deformed.

As described above, according to the camera of the embodiment, the block portion 30 holding the device for range-finding, the finder and so on, and the semicylindrical portion 40 holding the battery are integrally configured, so the number of components can be reduced, thereby resulting in a reduction in the manufacturing costs. Further, as the number of components mounted on the camera body 10 is reduced, the steps of mounting components becomes simpler, thereby the manufacturing process becomes simpler.

Moreover, as the take-up spool 13A is held by the pressure plate 42 of the semicylindrical portion 40 in the axial direction, no parts for holding the take-up spool 13A are required, thereby the number of components can be reduced further.

In addition, as the elastic deformable L-shaped axis 37 is disposed between the block portion 30 and the semicylindrical portion 40, an external force applied to semicylindrical portion 40 when the battery B is installed can be reduced so as not to be transmitted to the block portion 30 and so on. Therefore, the block portion 30 holding components which are required to be mounted with a high degree of accuracy can be prevented from being deformed.

Further, when the holding member 2 is mounted on the camera body 10, the holding member 2 is secured to the camera body 10 at a plurality of points aligned on opposite sides of the central axis L in a direction along the central axis L, so distortions which may occur in the holding member 2 can be dispersed.

Although the invention has been described by the embodiment, the invention is not limited to the foregoing embodiment but can be variously modified.

As described above, according to the camera of the invention, the holding member integrally including the first holding portion for holding a range-finding system and the second holding portion for holding a battery is used, so that the number of components can be reduced, thereby resulting in a reduction in the manufacturing costs. Further, as the number of components mounted in the camera body is reduced, the steps of mounting components becomes simpler, thereby the manufacturing process becomes simpler.

According to the camera of one aspect of the invention, as the elastic deformable buffer portion is disposed between the first holding portion and the second holding portion, an external force applied to the second holding portion when the battery is installed can be reduced so as not to be transmitted to the first holding portion. Therefore, the second holding portion which includes components to be mounted with a high degree of accuracy can be prevented from being deformed.

According to the camera of another aspect of the invention, the holding member further holds the take-up spool for taking up a film, so the number of components can be reduced more.

According to the camera of still another aspect of the invention, the holding member is secured to the camera body at a plurality of points aligned at a plurality of points alternately aligned on opposite sides of the central axis in a direction along the central axis, so that distortions which may occur in the holding member when the holding member is mounted on the camera body can be dispersed.

Obviously many modifications and variations of the present invention are possible in the light of the above teachings. It is therefore to be understood that within the scope of the appended claims the invention may be practiced otherwise than as specifically described.

What is claimed is:

1. A camera having a range-finding system for measuring a lens-to-subject distance and using a battery, the camera comprising:
    a camera body; and
    a holding member mounted on the camera body, and integrally including a first holding portion for holding at least the range-finding system and a second holding portion for holding the battery, wherein the holding member further integrally includes an elastic deformable buffer portion disposed between the first holding portion and the second holding portion.

2. A camera according to claim 1, wherein
    the camera body includes a rotatable take-up spool for taking up a film, and
    the holding member holds the take-up spool to be rotatable.

3. A camera according to claim 2, wherein the holding member has a shape extending in a longitudinal direction with a width in a direction orthogonal to the longitudinal direction, and
    the holding member is secured to the camera body at a plurality of points determined in a staggered arrangement both sides of an central axis, the central axis passing through a center of the width and extending in the longitudinal direction.

4. A camera according to claim 3, wherein the first holding portion further holds a finder.

5. A camera according to claim 2, wherein the first holding portion further holds a finder.

6. A camera according to claim 1, wherein the holding member has a shape extending in a longitudinal direction with a width in a direction orthogonal to the longitudinal direction, and
    the holding member is secured to the camera body at a plurality of points determined in a staggered arrangement both sides of a central axis, the central axis passing through a center of the width and extending in the longitudinal direction.

7. A camera according to claim 6, wherein the first holding portion further holds a finder.

8. A camera according to claim 1, wherein the first holding portion further holds a finder.

9. A camera having a range-finding system for measuring a lens-to-subject distance and using a battery, the camera comprising:
    a camera body including a rotatable take-up spool for taking up a film; and
    a holding member mounted on the camera body, and integrally including a first holding portion for holding at least the range-finding system and a second holding portion for holding the battery, and wherein the holding member holds the take-up spool to be rotatable.

10. A camera according to claim 9, wherein the holding member has a shape extending in a longitudinal direction with a width in a direction orthogonal to the longitudinal direction, and the holding member is secured to the camera body at a plurality of points determined in a staggered arrangement both sides of a central axis, the central axis passing through a center of the width and extending in the longitudinal direction.

11. A camera according to claim 10, wherein the first holding portion further holds a finder.

12. A camera according to claim 9, wherein the first holding portion further holds a finder.

13. A camera having a range-finding system for measuring a lens-to-subject distance and using a battery, the camera comprising:

a camera body; and a holding member mounted on the camera body, and integrally including a first holding portion for holding at least the range-finding system and a second holding portion for holding the battery; and wherein the holding member has a shape extending in a longitudinal direction with a width in a direction orthogonal to the longitudinal direction, and the holding member is secured to the camera body at a plurality of points determined in a staggered arrangement on both sides of a central axis, the central axis passing through a center of the width and extending in the longitudinal direction.

14. A camera according to claim 13, wherein the first holding portion further holds a finder.

* * * * *

UNITED STATES PATENT AND TRADEMARK OFFICE
CERTIFICATE OF CORRECTION

PATENT NO.    : 6,661,971 B2
DATED         : December 9, 2003
INVENTOR(S)   : Mitsuo Manabe, Kenji Yamane and Yukihiro Kaneko It is certified that error appears in the above-identified patent and that said Letters Patent is hereby corrected as shown below:

<u>Title page,</u>
Item [73], Assignee, please change "Fuji Photo Opticsal Cp., Ltd." to -- Fuji Photo Optical Co., Ltd. --

Signed and Sealed this

Thirteenth Day of April, 2004

JON W. DUDAS
*Acting Director of the United States Patent and Trademark Office*